Nov. 11, 1941.  J. PAVLISKA  2,262,404
GRAIN BIN
Filed Dec. 18, 1940  2 Sheets-Sheet 1
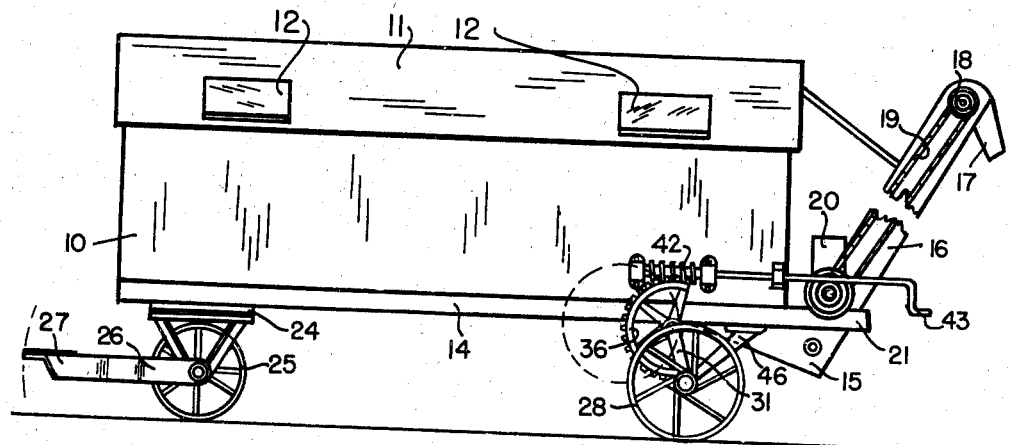
FIG. 1
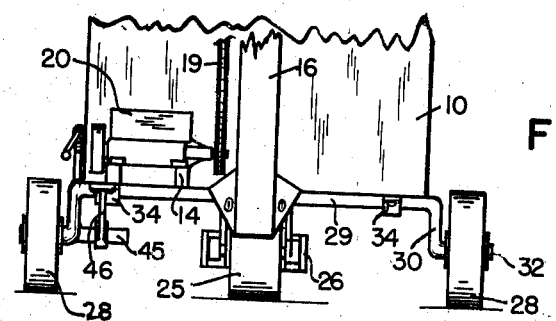
FIG. 2
FIG. 4
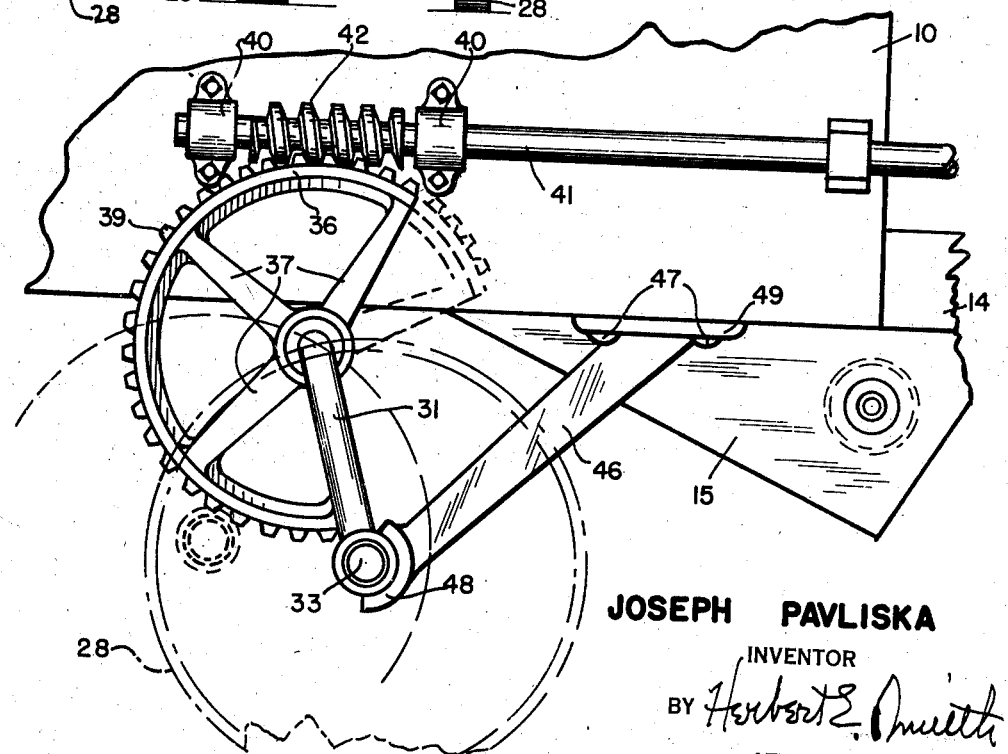
JOSEPH PAVLISKA
INVENTOR
BY Herbert E. Smith
ATTORNEY Nov. 11, 1941.  J. PAVLISKA  2,262,404
GRAIN BIN
Filed Dec. 18, 1940  2 Sheets-Sheet 2
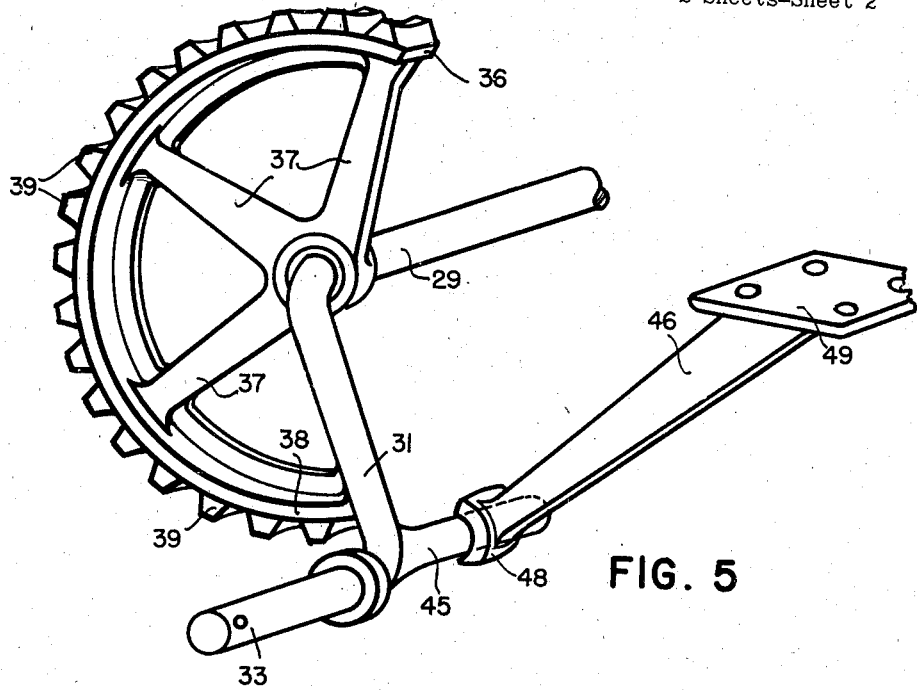
FIG. 5
FIG. 3
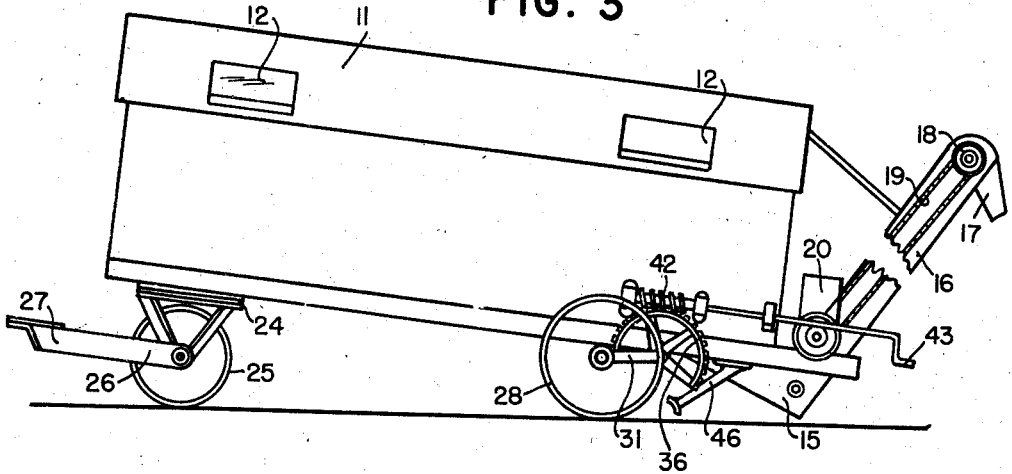
JOSEPH PAVLISKA
INVENTOR
BY Herbert E. Smith
ATTORNEY Patented Nov. 11, 1941

2,262,404

UNITED STATES PATENT OFFICE 2,262,404

GRAIN BIN

Joseph Pavliska, Odessa, Wash.

Application December 18, 1940, Serial No. 370,583

1 Claim. (Cl. 280—6)

My present invention relates to a grain bin and is particularly adaptable to portable grain bins or bulk bins in which quantities of material are stored, either temporarily or permanently, and from which the material being stored is to be easily removed.

There are many uses for portable vehicles of the type above described, as well as for other vehicles in which it is desirable to tilt the mechanism either forwardly or rearwardly so that the bottom of the bin can be caused to slope for the purpose of enhancing the removal of the bulk contents of the bin.

In the harvesting of wheat the use of bulk bins is very common, and in many harvester mechanisms a bulk bin is furnished on the harvester machine into which the grain, as it is threshed, is dumped until a large quantity has accumulated. When the bulk bin is substantially full the contents are discharged into another vehicle such as a truck for transportation to the storage elevators or railroad cars.

If the haul from the harvesting field to the storage bins or the like is long, or if a limited number of hauling vehicles are available, it is not always possible to dump the grain bin or hopper on the harvesting mechanism as often as is required. For the purpose of intermediate storage many grain growers have provided an auxiliary portable storage bin into which grain may be dumped temporarily or for permanent storage. This bin preferably has an extremely large capacity. Whether the storage is temporary or semi-permanent in such portable bins, a time will come when it is desirable to empty the grain bin. For that purpose these bins are often provided with an elevator mechanism which operates in a sump or low hopper in the bin to raise the grain to a height sufficient for it to be discharged into the body of transporting means such as a truck.

Due to the fact that these portable bulk grain vehicles are built for large capacity, it is almost essential that they be built close to the ground so that the center of gravity is always low to remove the danger of accidental tilting or tipping. A natural consequence of such modes of construction is that only a limited space under the vehicle is available for the sump or elevator mechanism which may raise or lower an end of the vehicle.

It is desirable that any tilting mechanism that may be employed in connection with such a vehicle be operable in a compact space. Also, it must be operable to lower the vehicle as far as possible in order to gain the greatest incline in the interior of the vehicle. The inclining of the floor permits the grain to flow downwardly into the sump from which it is elevated.

An important object of my invention has been the provision of tilting mechanism operable in a limited area in connection with a vehicle to lower one end of the vehicle and to thus incline the floor within the vehicle.

Another object of my invention has been to provide a tilting mechanism operable to lower an end of a vehicle, which mechanism employs a crank axle having means associated therewith for permitting the easy manual or power raising or lowering of the vehicle.

A further object of my invention has been the provision of means cooperable with the crank axle to hold the vehicle in the raised position without the crank being necessarily held in position solely by the raising and lowering means.

Still another object of my invention has been the provision of a grain bin having tiltable means associated therewith and also elevating means operable to evacuate the tilted bin.

A still further object of my invention has been the employment of a segmental worm wheel and pinion operable upon a crank axle to raise or lower the vehicle with relation to the axis of rotation of the ground engaging wheels also associated with said axle.

Other objects and advantages of my invention will be apparent during the course of the following description wherein I have illustrated a preferred form of my invention.

In the drawings

Figure 1 is a side elevational view of a vehicle showing the tilting mechanism of my invention as well as an elevator mechanism associated therewith.

Figure 2 is a fragmentary elevational view as of the right hand end of the vehicle of Figure 1.

Figure 3 is a side view of the vehicle of Figure 1 in the tilted position.

Figure 4 is an enlarged detail elevational view of the tilting mechanism and showing the manner in which it is associated with the vehicle, and Figure 5 is an enlarged detail perspective view of the worm wheel segment, a portion of the crank axle, and showing a brace arm employed in cooperation therewith.

The reference numeral 10 refers to a vehicle having a bottom and end and side walls arranged together in a rectangular manner to define a bin. I have provided this bin with a sloping roof 11 having the hatches 12, 12 which are provided for easy access to the interior of the bin, primarily for introducing grain or the like thereto.

The vehicle is formed upon suitable frame members 14. In Figure 1 it will be seen that I have provided the vehicle with a hopper bottom 15 with which is associated an elevator casing 16, having the usual elevator flight within (but not shown for the reason that it forms no important part of the present invention). A delivery nozzle 17 is provided for directing the flow of the grain as it is discharged from the elevator flight. The elevator flight is operated by means of the pulley or sheave 18 which is rotated through the instrumentality of the drive chain 19.

Power is applied to the drive chain 19 by means of the motor 20 which is suitably supported on extension 21 of the frame of the vehicle.

The front of the vehicle has a turntable 24 which pivotally mounts a single caster wheel 25. A yoke 26 and tongue 27 are provided so that the vehicle may be attached behind tractive means for movement about the field and over the ground surface.

For supporting the rear end of the vehicle I use a pair of ground engaging members such as wheels 28, 28. I also employ the crank axle 29, having arms 30 and 31 which have trunnion portions 32 and 33 upon which the wheels 28, 28 are journaled for rotation. Suitable bearing boxes 34, 34 mount the throw 29 of the crank axle upon the body 10 for pivotal movement.

Referring to Figure 5 it will be seen that the axle 29 and arm 31 at the left end of the showing of Figure 2 has the worm wheel segment 36 which is supported in concentric relation to the axis of the axle 29 by means of the arms 37, and by reason of the fact that the end 38 joins the arm 31. The worm segment has the conventional teeth 39 for cooperative engagement with a worm 42.

Upon the side of the box or housing 10 I provide suitable bearing members 40, 40 in which the shaft 41 is journaled. On shaft 41 I mount the worm 42 which meshes with the teeth 39 of the worm segment 36. The end of the shaft 41 may be formed with a crank 43 so that it may be manually rotated to cause the worm to operate or function in connection with the worm wheel segment. Power drive means may also be employed to turn shaft 41.

The arm of 31, as can best be seen in Figures 2 and 5, has the stub axle or shaft 45 which extends inwardly in approximate parallel relation to the shaft 29. A brace arm 46 having the attaching plate 49 is secured to the under side of the vehicle body by means of bolts 47, 47. A pad or segmental rest 48 is formed on the outer end of the arm 46 for abutting engagement by the stub shaft 45. When the vehicle is raised to its upper position, the shaft 45 rests against the segment 48 and is thereby braced to steady the arm 36 and the arms 30 and 31.

It will be seen in Figures 1 and 4 that when the vehicle is raised to the level keel the arm 31 disposes the wheel trunnions 33 and 32 slightly to the rear of the pivotal axis of the shaft 29 where it is attached on the under side of the vehicle.

When the grain bin is tilted to the position shown in Figure 3 the crank 43 is manually turned causing the worm to slowly rotate the segment 36 and thus permit the arm 31 and its trunnion 30, as well as the arm 30 and its trunnion 32, to swing as indicated in Figure 3. As the gear segment assumes the position shown in Figure 3 it will be apparent that the floor or decking within the bin is inclined and that the grain therein will flow to the right toward the sump or hopper 15 provided to facilitate the loading operation of the elevator flight in the spout 16.

Due to the fact that a worm is normally designed to resist rotative force applied thereto by means of the force transmitted by the crank 29 which is eccentric to its center of support in the ground engaging wheels, the vehicle will come to rest at whatever tilt the operator ceases rotating the worm 32. The vehicle can be readily returned to its normal level position by reversing the direction of rotation imparted to the shaft 41 and its worm.

The foregoing description and the accompanying drawings are believed to clearly disclose a preferred embodiment of my invention. It will, however, be apparent and it is to be understood that this disclosure is illustrative and that such changes and alterations in the invention as are fairly within the scope and spirit of the subjoined claim can be made.

Having thus fully described my invention, what I claim as new and desire to secure by Letters Patent is:

In a portable storage bin, a tilting mechanism for vehicles comprising a transverse axle having bearings for pivotally associating the crank of said axle with the vehicle, an offset trunnion and a crank on each end of said axle and ground engaging members associated with the trunnions, a worm wheel segment mounted on the crank of said axle in concentric relation thereto, a worm associated with the teeth of said wheel segment, means for rotating said worm whereby the worm wheel segment is partially rotated about the axis of said axle thus causing the crank associated therewith to swing radially about the axial center of the ground engaging members, a stub shaft associated with an arm of the crank axle, and a brace arm cooperable with said stub shaft of said crank when the vehicle is in the raised position to relieve strain that would otherwise be imparted to the worm wheel segment and its worm.

JOSEPH PAVLISKA.